United States Patent
Czaplewski et al.

(10) Patent No.: US 10,208,774 B2
(45) Date of Patent: Feb. 19, 2019

(54) FASTENER WITH CENTER FOR LIMITING ENGAGEMENT

(71) Applicant: International Business Machines Corporation, Armonk, NY (US)

(72) Inventors: Sarah K. Czaplewski, Rochester, MN (US); Lee N. Helgeson, Rochester, MN (US); Jonathan L. Kaus, Rochester, MN (US); Pamela L. Lembke, West Lafayette, IN (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 15/286,636

(22) Filed: Oct. 6, 2016

(65) Prior Publication Data
US 2018/0100530 A1    Apr. 12, 2018

(51) Int. Cl.
| | |
|---|---|
| F16B 35/02 | (2006.01) |
| F16B 1/00 | (2006.01) |
| F16B 31/02 | (2006.01) |
| F16B 23/00 | (2006.01) |
| F16B 41/00 | (2006.01) |

(52) U.S. Cl.
CPC ............ F16B 1/0071 (2013.01); F16B 35/02 (2013.01); F16B 23/0007 (2013.01); F16B 31/02 (2013.01); F16B 41/005 (2013.01)

(58) Field of Classification Search
CPC .......... F16B 5/02; F16B 21/065; F16B 31/02; F16B 35/02; F16B 35/04
USPC ................................. 411/382, 383, 384, 395
See application file for complete search history.

(56) References Cited

U.S. PATENT DOCUMENTS

| | | | | |
|---|---|---|---|---|
| 990,065 A | * | 4/1911 | Sargeant ............... | F16B 39/023 411/271 |
| 1,194,792 A | * | 8/1916 | Stewart ................. | B42F 13/12 411/178 |

(Continued)

FOREIGN PATENT DOCUMENTS

| | | |
|---|---|---|
| CN | 202101635 | 1/2012 |
| CN | 202522179 | 11/2012 |

(Continued)

OTHER PUBLICATIONS

IBM, Self-Indicating Clamp Bolt, IP.com Prior Art Database Technical Disclosure, Jul. 1, 1990, IPCOM000101274D, Col. 33, No. 2, pp. 342-344.

(Continued)

*Primary Examiner* — Roberta S Delisle
(74) *Attorney, Agent, or Firm* — Lieberman & Brandsdorfer, LLC

(57) ABSTRACT

Embodiments of the disclosure relate to an apparatus that disengages a tool and indicates undesired contact. More specifically, the embodiments of the disclosure relate to a fastener that limits over insertion, indicates over insertion, and limits undesired contact of that fastener with a surface. Further, the apparatus can limit damage to an underlying component such as a circuit board. The apparatus has a shank having a cavity extending through the shank. Additionally, the shank has a recess for installation by a tool. A slider is positioned within the shank wherein the slider can limit engagement with the recess and indicate a condition.

20 Claims, 7 Drawing Sheets

(56) References Cited

U.S. PATENT DOCUMENTS

| | | | | |
|---|---|---|---|---|
| 1,467,824 | A * | 9/1923 | Ahlers | F16B 39/36 403/408.1 |
| 2,855,686 | A | 10/1958 | Charles | |
| 3,461,769 | A * | 8/1969 | Brosseit | F16B 5/0233 403/408.1 |
| 5,219,254 | A * | 6/1993 | Ball, Sr. | F16B 13/065 411/271 |
| 5,333,977 | A * | 8/1994 | Sugawara | F16B 39/023 411/271 |
| 5,855,460 | A * | 1/1999 | Brehmer | B60T 17/086 411/14 |
| 7,329,076 | B2 * | 2/2008 | Hartney | F16B 39/028 33/520 |
| 7,475,599 | B2 | 1/2009 | Frank et al. | |
| 7,967,562 | B2 * | 6/2011 | Frost | F02K 1/80 29/525.02 |
| 8,281,678 | B2 | 10/2012 | Cavalier et al. | |
| 8,491,245 | B2 * | 7/2013 | Lin | F16B 35/00 411/325 |
| 2004/0057810 | A1 * | 3/2004 | Breslin | F16B 13/126 411/383 |

FOREIGN PATENT DOCUMENTS

| | | |
|---|---|---|
| CN | 203310353 | 11/2013 |
| CN | 204461315 | 7/2015 |
| DE | 202014103609 | 10/2014 |
| TW | 201544721 | 12/2015 |

OTHER PUBLICATIONS http://www.vlier.com/product_index/sld/sp_00_index.html, 2007.
http://www.oempromo.com/Tools-and-Hardware/Gauges/, 2010.

* cited by examiner

FASTENER WITH CENTER FOR LIMITING ENGAGEMENT

BACKGROUND

The present disclosure relates generally to apparatus that disengage a tool when brought into contact with a surface, with the disengagement serving as an indication of undesired contact with the surface. More specifically, the embodiments of the disclosure relate to a fastener that limits communication between the fastener and the surface.

A fastener is recognized as a hardware device that mechanically joins or affixes two or more objects together. It is understood that when the fasteners join the objects, the fastener may extend a distance further than desired, referred to herein as a hyper-extension, and this hyper-extension may cause interference with one or more product components. There are different causes for hyper-extension, including but not limited to, overextension caused by over torqueing and improper selection of the fastener for the task (e.g. installation error). In another instance, the fastener could be selected properly but the receiving object could be improperly designed to accommodate the fastener (e.g. design error). When a fastener is in a hyper-extended position, e.g. installed beyond a desired depth, the fastener may unintentionally contact one or more secondary components, which may cause issues with the fastener, the contacted component and/or the receiving object associated with the fastener In electronics manufacturing, fasteners are employed to support electronic joining of objects that may be subject to or support electrical communication. For example, fasteners may be employed to fix hardware products to a printed circuit board. If the fastener is not properly configured or designed for either the hardware product and/or the printed circuit board, the fastener may improperly or unintentionally come into contact with the printed circuit board. This unintended or improper contact can cause shorts, burns, and other damage to the printed circuit board. Torque identification alone will not prevent the contact between the fastener and the board. For instance, if the selected fastener was improperly selected (e.g. larger than desired) the fastener will contact the board before the fastener is indicated to be over torqued.

SUMMARY

The disclosed embodiments pertain to an apparatus that limits undesired contact and indicates over insertion.

In one aspect, an apparatus is provided with a shank having a proximal end and an oppositely disposed distal end. More specifically, the shank is provided with a shank cavity extending through the shank from the proximal end to the distal end. The proximal end of the shank includes a recess. A slider, having a first end and a second end, is positioned within the shank cavity. As a position of the slider with respect to the shank cavity changes, engagement with the recess becomes limited.

In another aspect, a system is provided to limit undesired contact. The system includes a shank that is sized to receive a slider. The shank has a proximal end and an oppositely disposed distal end. In addition, the shank is configured with a shank cavity extending through the shank from the proximal end to the distal end. The proximal end of the shank includes a recess. The slider has a first end and a second end, and more specifically, the slider is positioned within the shank cavity. As the position of the slider with respect to the shank cavity changes, engagement with the recess becomes limited.

In yet another aspect a method is associated with the functionality of shank is provided. More specifically, a shank is provided having a proximal end and an oppositely disposed distal end. The shank is configured with a shank cavity extending through the shank from the proximal end to the distal end, and the proximal end of the shank includes a recess. Additionally, a slider, having a first end and a second end, is positioned within the shank cavity. As force is applied to the shank, a position of the slider within the shank cavity with respect to the position of the fastener changes. In response to the slider attaining an undesired contact, the position of the slider with respect to the shank limits engagement with the recess.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
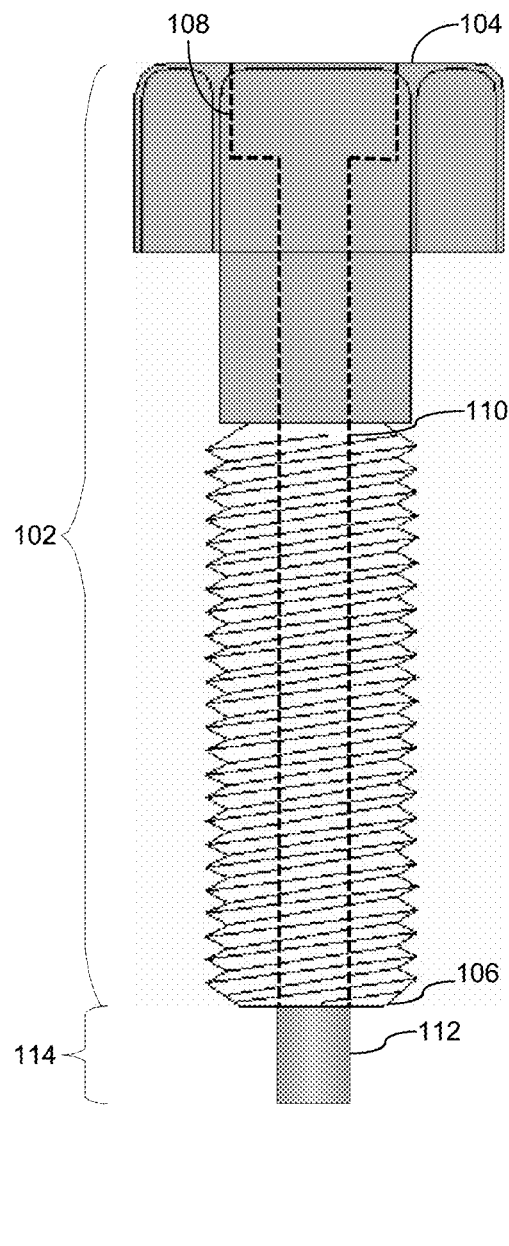
FIG. 1 depicts a diagram illustrating one embodiment of an apparatus to limit undesired contact with an object.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A method and apparatus to limit installation beyond a desired depth, indicate installation beyond a desired depth, and indicate undesired contact are provided, with embodiments discussed below in detail. As shown and described, the apparatus may be but is not limited to, fasteners, plugs and seals. In one embodiment, the apparatus is provided with a shank and a slider. The slider is positioned within the apparatus. More specifically, the slider is configured to move towards a recess, and functions to limit engagement with the recess positioned within the apparatus if the slider contacts a secondary surface. The slider precludes further installation of the apparatus with respect to a secondary object since the movement changes the position of the slider so that the recess can no longer be engaged. In one embodiment, the position of the slider indicates undesired contact with the secondary surface. In one embodiment, the position of the slider indicates the apparatus is installed beyond a desired depth with respect to the secondary object. Accordingly, the slider functions in conjunction with the apparatus to limit undesired contact and indicate a condition.

It is understood in the art that fasteners extending further than desired can cause issues with underlying components. For example, in the case of a fastener with a conductive property, and the secondary object with a conductive property, undesired contact between the fastener and the secondary object can cause an electrical short, burn, damage, etc. In one embodiment, the slider is comprised of a non-conductive material so that contact between the slider and any secondary surface or object may limit shorts, burns or other damage. In another embodiment, the slider is comprised of a plastic material. In another embodiment, the plastic is comprised of nylon. In one embodiment, the slider functions as a barrier between the shank and a contacted secondary surface. Accordingly, the configuration and use of the slider and shank described herein mitigates presentation of the undesired contact.

Referring to FIG. 1, a diagram (100) is provided illustrating a front view (100) of one embodiment of the apparatus to limit undesired contact with a secondary object or a secondary surface. In the embodiment shown herein, the apparatus is shown and referred to as a mechanical fastener, also referred to as a fastener. As shown, the fastener includes a shank (102) having a proximal end (104) and an oppositely disposed distal end (106). The proximal end (104) of the shank (102) is provided with a recess (108). The recess (108) may be in the form of a variety of geometric configurations designed to receive a secondary tool and to provide a force for installation of the fastener. For example, in one embodiment, the geometric configuration is designed to receive a screwdriver, or similar device, that applies a force on the apparatus for installation in an opening. It is understood that when installing the fastener, undesired contact between the shank (102) and a secondary surface (not shown) may occur, and in one embodiment this undesired contact may cause damage to the shank (102), the secondary surface, or secondary object in communication with the shank (102). A slider (112) is positioned in communication with shank (102), and functions to limit contact of the shank (102) with the secondary surface. As described in detail below, the configuration of the slider (112) within the shank (102) limits engagement of an installation device with the recess (108). Accordingly, the slider functions to mitigate or eliminate undesired contact by limiting engagement of an installation device with the recess.

As shown, the shank (102) is configured with a cavity (110), also referred to herein as a shank cavity, that extends the length of the shank from the proximal end (104) to the distal end (106). The shank cavity (110) and the slider (112) are each sized so that the slider (112) is received by the shank cavity (110). In one embodiment, the slider (112) has an interference fit between its outer surface and the shank cavity (110) such that at least a minimal force is required to move the slider (112) and effectively change the position of the slider (112) within the cavity (110). The position of the slider (112) within the shank cavity (110) is shown in detail in FIG. 2. The slider (112) moves in a direction towards the recess (108) and can change position with respect to the shank cavity (110) wherein changing position affects engagement with the recess (108). For instance, in an initial position, the slider (112) extends through the distal end (106), as shown, and does not encroach upon the area of the recess (108), thereby making the recess (108) available for engagement. However, when the slider (112) contacts the secondary surface (not shown), the slider (112) will be subject to movement and change position within the shank cavity (110). More specifically, the movement causes the slider (112) to encroach within the area of the recess (108) thereby limiting space available within the recess (108) for engagement or receipt of a secondary fastening element with the recess (108). In one embodiment, the limited engagement within the recess (108) precludes further installation of the fastener. As shown herein, the slider (112) is configured with an extension (114) that extends beyond the distal end (106) of the shank (102). The extension (114) functions to contact the secondary surface prior to contact between the shank (102) and the secondary surface. Accordingly, the apparatus functions to limit undesired contact between the shank and the secondary surface.

Figure 2:
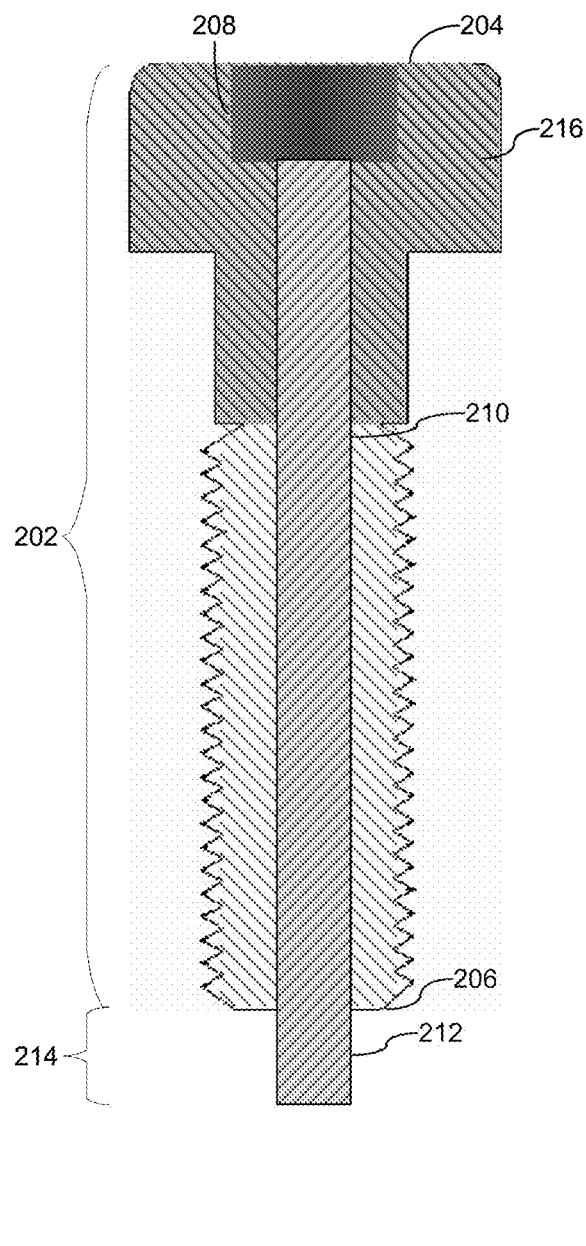
FIG. 2 depicts a cross-section illustrating one embodiment of an apparatus to limit undesired contact with an object.

Referring to FIG. 2, a cross-section (200) of the fastener shown and described in FIG. 1. is provided. More specifically, FIG. 2 illustrates an embodiment of the apparatus with the slider extended beyond the distal end of the shank to limit undesired contact with the secondary surface. As shown, the fastener is provided with a shank (202) having a proximal end (204) and an oppositely disposed distal end (206). In one embodiment, the shank contains a head (216) positioned in communication with the proximal end (204), and a recess (208) positioned in communication with the head (216). The recess (208) may be any geometric shape that a tool can engage to apply a force for installation of the fastener to a secondary object. As described with respect to FIG. 1 and shown in FIG. 2, a shank cavity (210) is positioned extending the length of the shank (202) from the proximal end (204) to the distal end (206). The shank cavity (210) and the slider (212) are each sized so that the slider (212) is received by the shank cavity (210). The slider (212) is positioned within the shank cavity (210), and is configured to slide towards the recess (208). The position of the slider (212) shown herein extends beyond the distal end (206) of the shank (202), so that the slider (212) engages a secondary surface or object and prevents contact between the distal end (206) of the shank (202) and the secondary surface or object. Accordingly, as shown herein, the slider (212) enables the fastener to engage in its function of securing an object while limiting undesired contact or engagement with the secondary object or surface.

As described herein, the slider (212) is configured for translational movement towards the recess (208). In other words, the position of the slider (212) is dynamic with respect to the position of the shank (202). At the same time, the changing position of the slider (212) affects the engagement with the fastener via the recess (208). For instance, in an initial position the slider (212) extends through the distal end (206) and does not encroach upon the area of the recess (208), thereby making the recess (208) available for engagement. However, when the slider (212) contacts a secondary surface (not shown), the slider (212) will be subject to movement and change position within the shank cavity (210). More specifically, the movement causes the slider (112) to encroach within the area of the recess (208) thereby limiting available space within the recess (208) for engagement or receipt of a secondary fastening element. In one embodiment, the limited engagement within the recess (208) precludes further installation of the fastener. As shown herein, the slider (212) is configured with an extension (214) that extends beyond the distal end (206) of the shank (202). The extension (214) functions to contact the secondary surface prior to contact between the shank (202) and the secondary surface. Accordingly, the apparatus functions to limit undesired contact between the shank and the secondary surface.

It may be desired to disengage a tool when the apparatus is brought into contact with a secondary surface and indicate the undesired contact. Therefore, referring to FIGS. 3a-d, cross-section diagrams are provided illustrating stages of one embodiment of an apparatus with the slider extended beyond the distal end of the shank to limit undesired contact with the secondary surface. Based on the system shown and described in FIGS. 1 & 2, referring to FIG. 3a, a cross-section diagram (300a) is provided illustrating an initial stage of installing the fastener that can disengage a tool when the apparatus is brought into contact with a secondary surface. The slider (312) is in an initial position with respect to the shank cavity (310) and does not encroach upon the area of the recess (308) thereby making the recess (308) available for engagement by a secondary tool (350). The slider (312) and shank (302) are not contacting the secondary surface (318). Accordingly, the secondary tool (350) can access the recess (308) to apply force for installation of the fastener.

Figure 3:
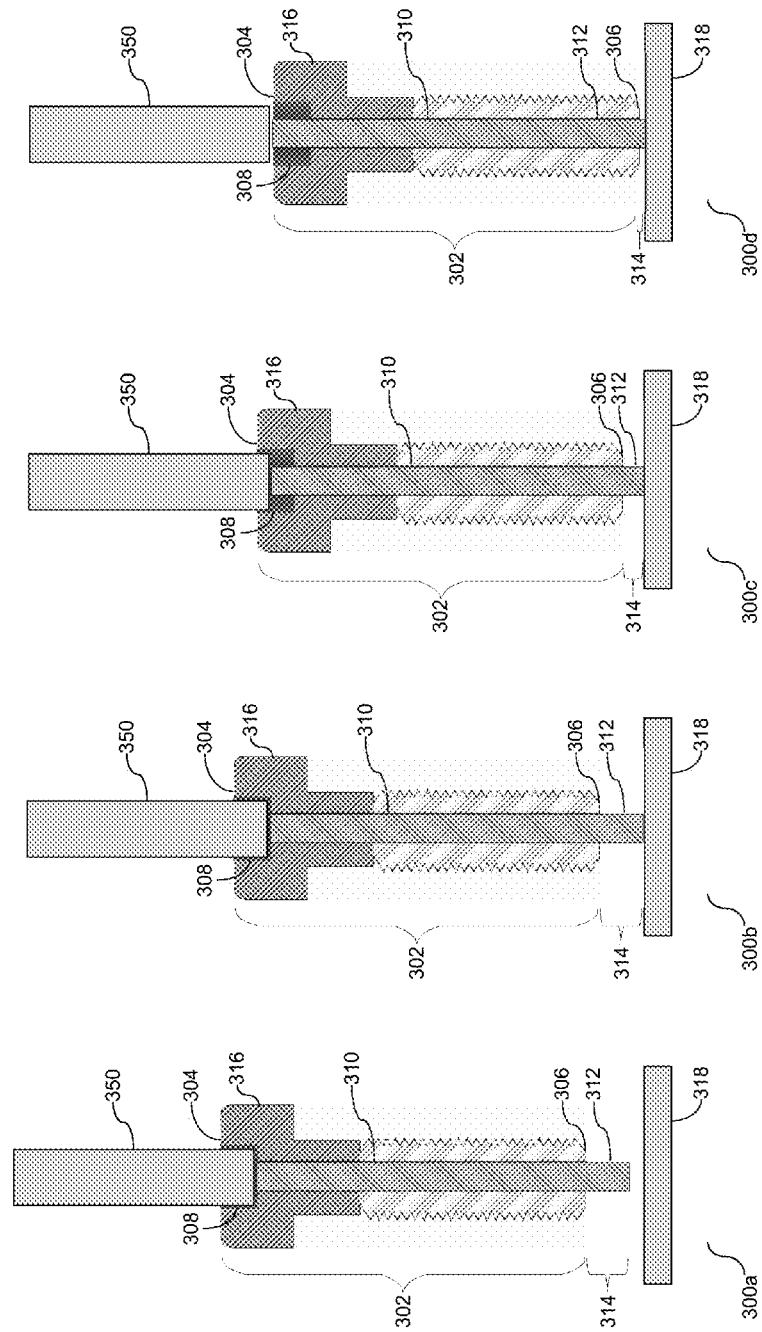
FIGS. 3a-d depicts cross-section diagram illustrating stages of one embodiment of an apparatus contacting an object and limiting engagement with the recess.

As a force is applied by the secondary tool (350), that is in communication with the shank (302) via the recess (308), the tool (350) causes the shank (302) to change position. Referring to FIG. 3b, a cross-section diagram is provided (300b) illustrating a contact stage of installing a fastener and disengagement of the tool (350) when the slider (312) is brought into contact with a secondary surface (318). The force has caused the shank (302) to change position, with the shank (302) shown here being closer to the secondary surface (318) in comparison to the position of the shank (302) with respect to the secondary surface (318) in FIG. 3a. In the position shown in FIG. 3b, the shank (302) is not touching the secondary surface (318). The slider (312) is in an initial position and has not changed position with respect to the shank cavity (310) compared to FIG. 3a. However, the slider (312) has changed position with respect to the secondary surface (318) as, the slider (312) is now touching the secondary surface (318), thereby bringing the distal end (306) of the shank (302) closer to the secondary surface (318) in comparison to the position of the slider (312) with respect to the secondary surface (318) in FIG. 3a. At the same time, the slider (312) does not encroach upon the area of the recess (308) thereby making the recess (308) available for engagement by the secondary tool (350). Accordingly, the shank and slider are shown to have changed position in response to application of a force from the secondary tool (350).

As additional force is applied by the secondary tool (350) to the shank (302) accessed via the recess (308), the shank (302) continues to change position. Referring to FIG. 3c, a cross-section diagram (300c) is provided illustrating a limited engagement stage of the fastener that can disengage the tool when an additional force is applied. As shown herein, the additional force has caused the shank (302) to change position, with the shank (302) shown closer to the secondary surface (318) compared to FIG. 3b. In other words, the gap between the slider and the secondary surface (318) is shown to have decreased. The shank (302) is shown as not having a direct contact, e.g. touch, with the secondary surface (318). At the same time, the slider (312) is shown to have moved to a changed position with respect to the shank cavity (310) compared to the slider position shown in FIG. 3b. The slider (312) has not changed position with respect to the object (318) as compared to FIG. 3b. Specifically, the slider (312) is shown remaining in direct contact, e.g. touching, with the secondary surface (318). The distal end (306) of the shank (312) is closer to the secondary surface (318) in comparison to the position shown in FIG. 3b. At the same time, the opposite end of the slider (312) is shown to have an encroachment into the recess (308), thereby occupying a limited area in the recess (308). The secondary tool (350) is shown herein to have a continued engagement within the recess (308). Accordingly, the slider (312) is shown herein to have moved within the shank cavity (310), and to have limited occupation within the recess (308).

As the force, by the secondary tool (350), continues to be applied to the recess (308), both the positions of the slider (312) and the shank (302) are subject to change. Referring to FIG. 3d, a cross-section diagram (300d) is provided illustrating a dis-engagement stage of the fastener when the apparatus is brought into contact with the secondary surface. The force has caused the shank (302) to change position, with the area between the distal end (306) of the shank (302) and the secondary surface (318) having significantly decreased in comparison to the area shown in FIG. 3c. The slider (312) is shown with movement to a changed position with respect to the shank cavity (310) in comparison to FIG. 3c. At the same time, the slider (312) has not changed position with respect to the secondary surface (318) in comparison to FIG. 3c. The extension (314) of the slider (312) is shown touching the secondary surface (318) and the opposite end of the slider (312) is shown occupying an increased area of the recess (308), thereby making the recess (308) unavailable for engagement by the secondary tool (350). As shown, the tool (350) is disengaged from the proximal end (304) of the shank (302) and removed from the recess (308), so that the tool (350) cannot apply a force to the shank (302). Accordingly, the slider has precluded the shank from contacting the secondary surface.

As shown in FIGS. 3a-d the slider changes position with relation to the shank cavity. In one embodiment, the position of the slider in relation to the shank cavity can be observed as an indication of a condition. The condition can be, but is not limited to, the apparatus contacting the secondary object or surface and the apparatus installed beyond a desired depth with respect to the secondary object or surface. In one embodiment, the observed change in position corresponds to the improper fastener length being chosen for the installation. In one embodiment, corrective action is taken to correct the installation depth. Accordingly, the slider can indicate a condition of the apparatus.

Since the slider can indicate a condition or prevent overextension of a fastener, it may be desirable to adjust the length of the slider before installation thereby tailoring the fastener to the needs of the user. For instance, the length of the slider may be adjusted by, but is not limited to, removing a portion of the slider, adding an extension to the slider, collapsing a portion of the slider, and turning a portion of the slider. Additionally, in one embodiment, the slider may be removed and exchanged with a different slider before installation of the apparatus. Accordingly, a predetermined size of slider may be selected prior to installation of the apparatus.

Figure 4:
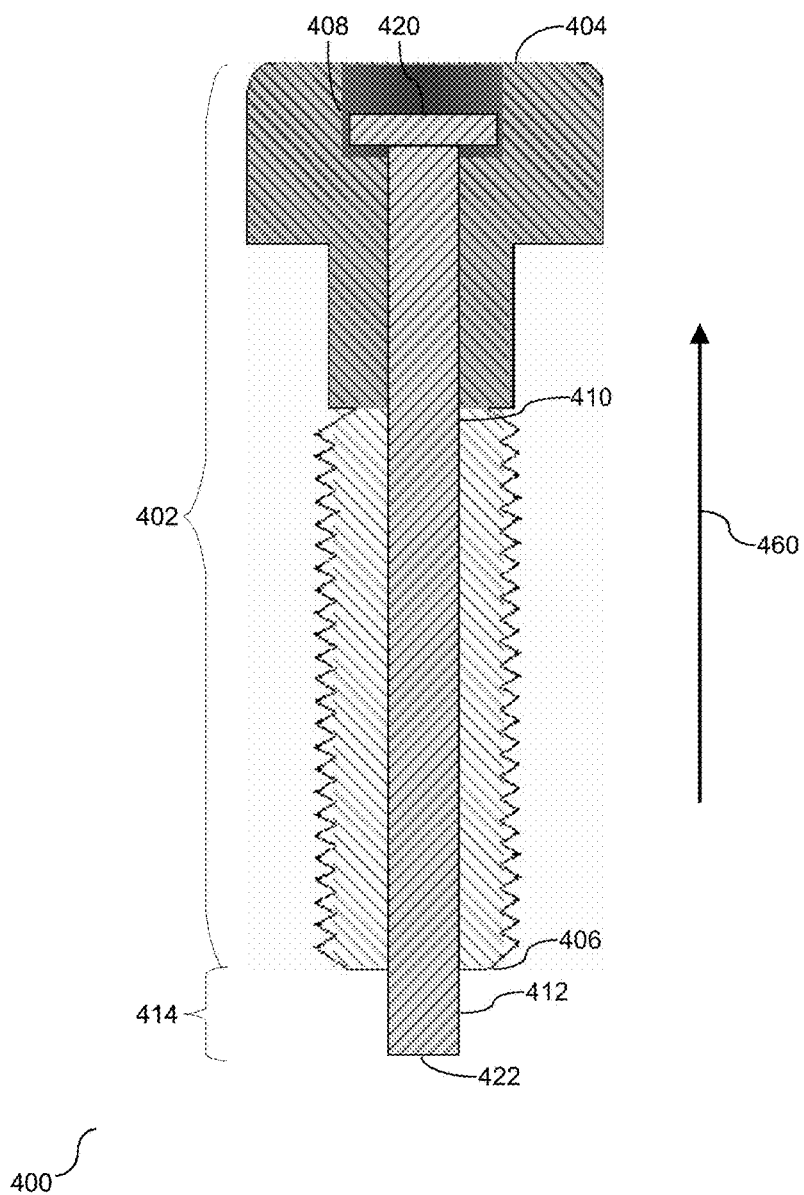
FIG. 4 depicts a cross-section diagram illustrating an apparatus with an exchangeable slider to limit undesired contact with an object.

An exchangeable slider can provide the user with optional installation depths. Further, an exchangeable slider allows the user to reuse the same slider in a plurality of shanks. Referring to FIG. 4, a cross-section (400) is provided illustrating one embodiment of an apparatus with an exchangeable slider to limit undesired contact with a secondary surface. As shown, a fastener includes a shank (402) having a proximal end (404) and an oppositely disposed distal end (406). The proximal end (404) of the shank (402) is provided with a recess (408). In order to limit installation of the shank (402), a slider (412) is provided to limit access and engagement with the recess (408).

As shown, the shank (402) is configured with a cavity (410), also referred to herein as a shank cavity, that extends the length of the shank (402) from the proximal end (404) to the distal end (406). The shank cavity (410) and the slider (412) are each sized so that the slider (412) is received by the shank cavity (410). The position of the slider (412) within the shank cavity (410) is shown in detail in FIG. 4. The slider (412) is shown moved in a direction (460) towards the recess (408) and having a changed position with respect to the shank cavity (410). Additionally, the slider (412) has a first end (420) and an oppositely disposed second end (422). The first end (420) of the slider is shown larger than an opening of the shank cavity (410) thereby precluding the first end (420) from moving through the shank cavity (410) beyond a predetermined distance. In the example shown herein, the first end of the slider (420) has a size measurement great than the size of the size of the shank cavity (410). In one embodiment, the shank cavity (410) varies in opening size longitudinally wherein a portion of the shank cavity (410) precludes movement of the first end (420) of the slider (412) beyond a predetermined distance. In one embodiment, the slider varies in width longitudinally wherein at least one portion of the slider precludes movement of the slide beyond a predetermined distance. In one embodiment, the slider can be removed from the proximal end of the shank. Accordingly, the non-uniform size of the slider limits translation of the slider through the shank cavity.

Figure 5:
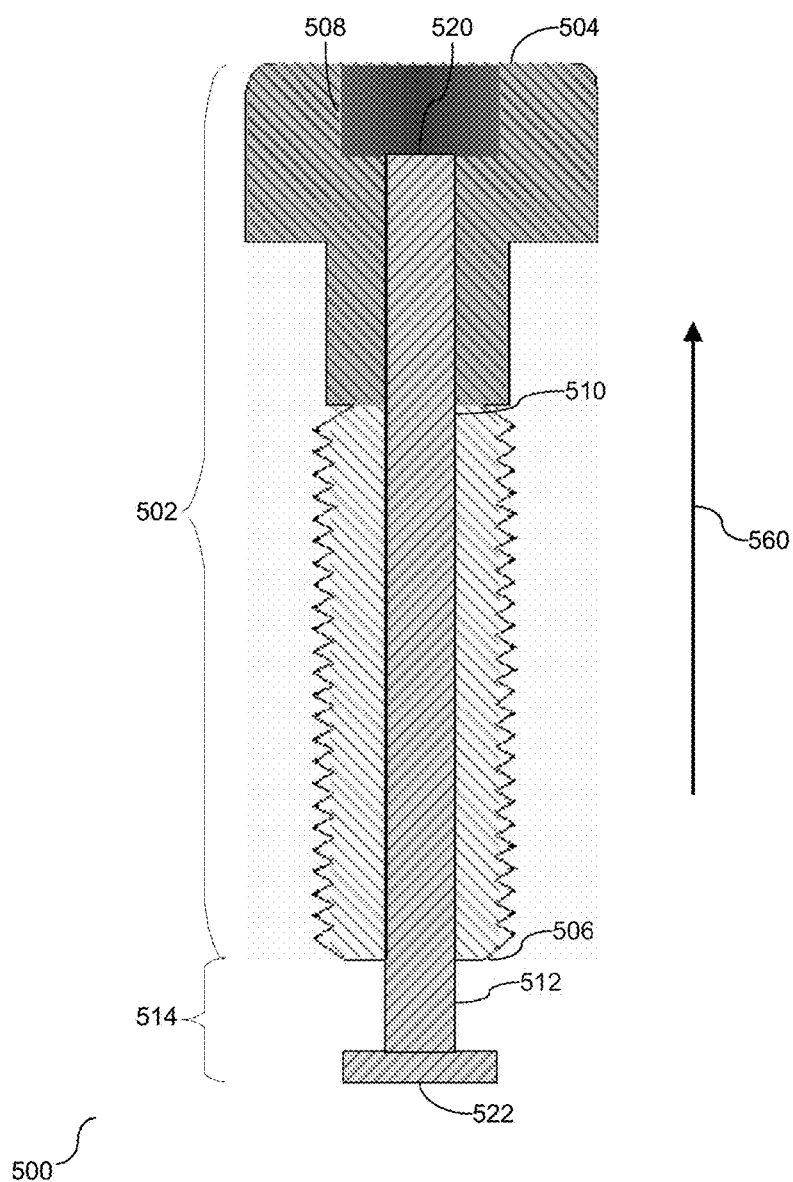
FIG. 5 depicts a cross-section diagram illustrating an apparatus with a secured slider to limit undesired contact with an object.

A secured slider can limit misplacement of the slider and limit the available surface area on the distal end of the shank. Referring to FIG. 5, a cross-section (500) is provided illustrating one embodiment of an apparatus with a secured slider to limit undesired contact with a secondary surface. As shown, a fastener includes a shank (502) having a proximal end (504) and an oppositely disposed distal end (506). The proximal end (504) of the shank (502) is provided with a recess (508). In order to limit installation of the shank (502), a slider (512) is provided with a geometric configuration that limits engagement with the recess (508).

As shown, the shank (502) is configured with a cavity (510), also referred to herein as a shank cavity, that extends the length of the shank (502) from the proximal end (504) to the distal end (506). The shank cavity (510) and the slider (512) are each sized so that the slider (512) is received by the shank cavity (510). The position of the slider (512) within the shank cavity (510) is shown in detail in FIG. 5. The slider (512) moves in a direction (560) towards the recess (508) and can change position with respect to the shank cavity (510) wherein changing position affects engagement with the recess (508). Additionally, the slider (512) has a first end (520) and an oppositely disposed second end (522). The second end (522) of the slider has a measurement that is larger than an aperture of the shank cavity (510), thereby precluding the second end (522) from moving through the shank cavity (510) beyond a predetermined distance. In one embodiment, the second end (522) has a measurement that precludes the distal end (506) of the shank (502) from contacting a secondary surface. In one embodiment, the shank cavity (510) varies in aperture size longitudinally wherein at least one measurement of the shank cavity (510) precludes the second end (522) of the slider (512) from entering the shank cavity (510). In one embodiment, the slider varies in measurement longitudinally wherein at least one portion of the slider precludes movement of the slider from moving beyond a predetermined distance. Accordingly, the non-uniform size of the slider precludes the slider from moving beyond a predetermined distance with respect to the shank cavity.

Figure 6:
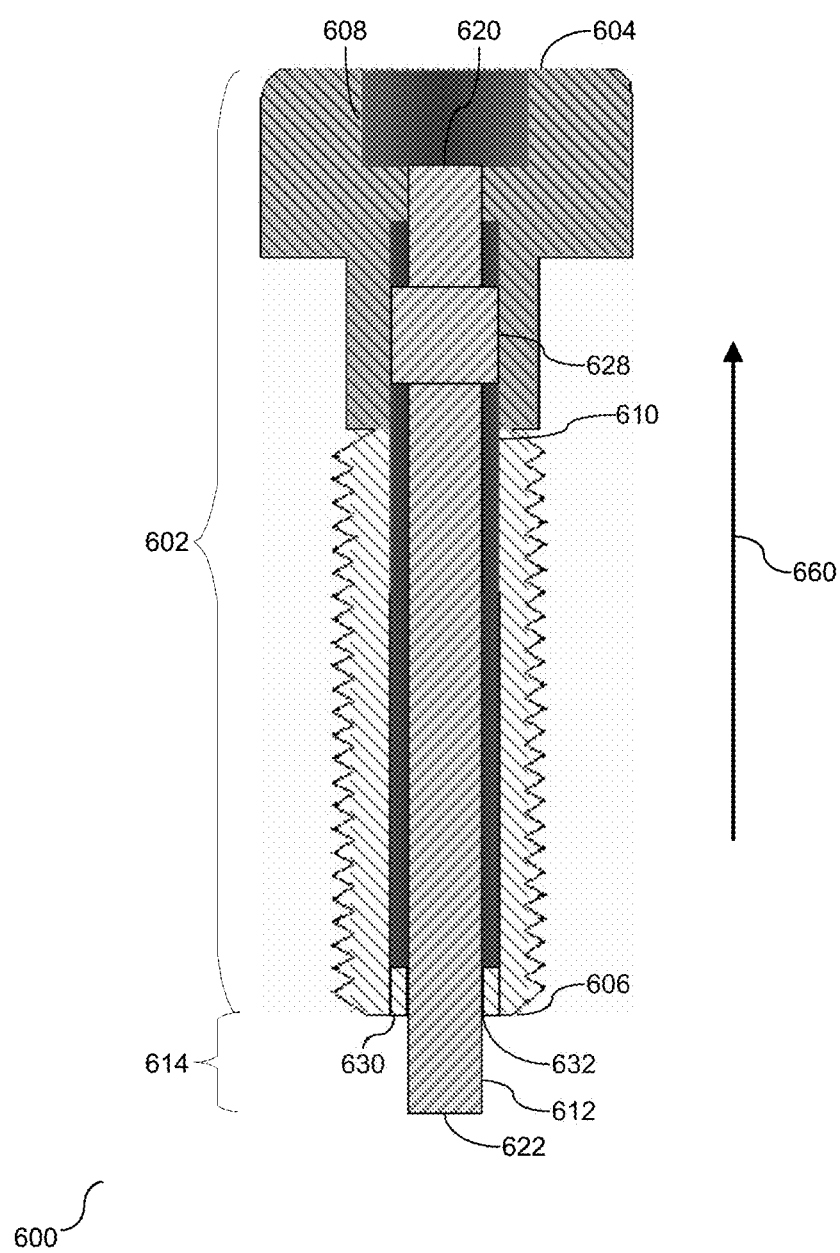
FIG. 6 depicts a cross-section diagram illustrating an apparatus with a captive slider to limit undesired contact with an object.

A captive slider can ensure the slider is not separated from the shank. Referring to FIG. 6, a cross-section (600) is provided illustrating one embodiment of an apparatus with a captive slider that limits undesired contact with a secondary surface. As shown, a fastener includes a shank (602) having a proximal end (604) and an oppositely disposed distal end (606). The proximal end (604) of the shank (602) is provided with a recess (608). In order to limit movement of the shank (602) with respect to a secondary object or surface, a slider (612) is provided in a configuration that limits engagement with the recess (608).

The slider (612) moves in a direction (660) towards the recess (608) and can change position with respect to the shank cavity (610) wherein changing position affects engagement with the recess (608). Additionally, the slider (612) has a first end (620), an oppositely disposed second end (622). A widest point (628) of the slider (612) is positioned between the opposite ends of the slider (612) and has a measurement that precludes the slider (610) from moving with respect to the shank cavity (610) beyond a predetermined distance. In one embodiment, the shank cavity varies in aperture size longitudinally wherein at least one measurement of the shank cavity precludes the slider from moving with respect to the shank cavity beyond a predetermined distance. In one embodiment, the width or cross-section of the slider varies in measurement longitudinally wherein at least one portion of the slider precludes the slider form moving with respect to the shank cavity beyond a predetermined distance. Accordingly, the non-uniform size of the slider limits translation of the slider through the shank cavity.

As shown, a plug (630) is positioned adjacent to the distal end (606) of the shank (602). In one embodiment, the plug (630) may be positioned adjacent to the proximal end (604) of the shank (602). The plug (630) has an aperture (632) that functions as an encumbrance to the widest point (628) of the slider (612), thereby precluding the widest point (628) from moving with respect to the shank cavity (610) beyond a predetermined distance. In one embodiment, the widest point (628) of the slider (612) has an interference fit within the shank cavity (610) as to friction or pressure between it and the shank cavity (610) in a way that requires more than minimal force for the slider (612) to move. In one embodiment, a spring (not shown) is in communication with the slider (612) and shank cavity (610). The spring ensures that at least a minimal force, e.g. such as a force greater than the tension of the spring, is required to move the slider (612) and effectively change the position of the slider (612) within the shank cavity (610). In one embodiment, the plug (630) is removable from the shank cavity (610). Accordingly, the plug is shown herein as a device to capture the slider in the shank cavity.

Figures 7A, 7B:
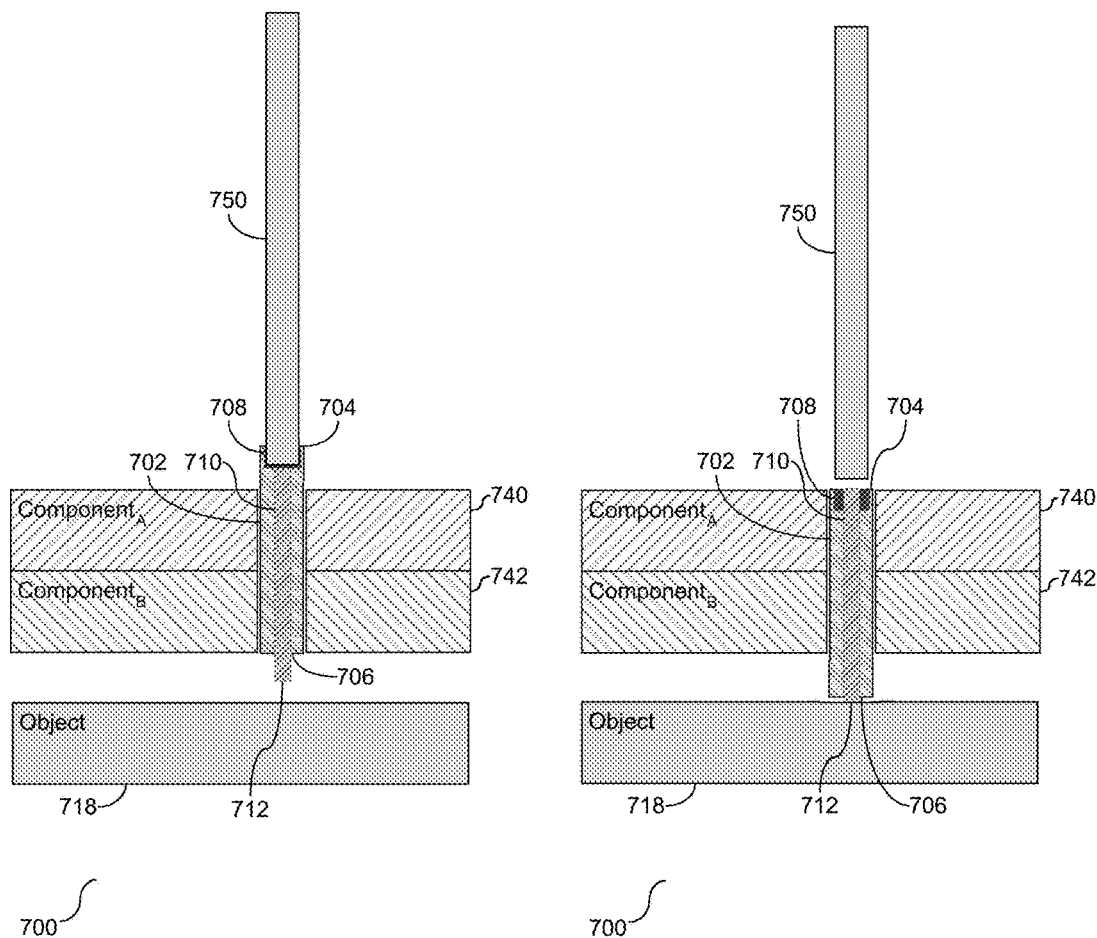
FIGS. 7a-b depicts a cross-section diagram illustrating stages of an apparatus with a slider limiting communication of the shank with an object.

It may be desirable to limit the communication of the fastener's shank with a secondary surface positioned beneath the component subject to the fastener installation. Referring to FIGS. 7a-b, a cross-section diagram (700) is provided illustrating stages of an apparatus with a slider limiting communication of the shank with a secondary object. Based on the system shown and described in FIGS. 1 & 2 and referring to FIG. 7a, the fastener is shown to secure component$_A$ (740) to component$_B$ (742). The slider (712) and shank (702) are not touching the secondary surface (718). In one embodiment, the secondary surface (718) is a printed circuit board and the slider (712) is comprised of a non-conductive material. A secondary tool (750) is provided for engagement with the recess (708). In FIG. 7a, the slider (712) is shown in an initial position with respect to the shank cavity (710) and does not encroach upon the area of the recess (708) thereby making the recess (708) available for engagement by a secondary tool (750).

As force is applied by the tool (750) positioned in the recess (708) of the shank (702), the position of the shank (702) changes. Referring to FIG. 7b the fastener is installed to a depth that causes contact between the slider (712) and the secondary surface (718). The depth of installation has caused the shank (702) to change position, as shown with the gap between the shank (702) and the secondary surface (718) decreased when compared to the gap shown in FIG. 7a. However, the shank (702) is not touching the secondary surface (718). The slider (712) has moved to a changed position with respect to the shank cavity (710) and with respect to the secondary surface (718) as compared to FIG. 7a. One end of the slider (712) is touching the secondary surface (718) and the opposite end of the slider (712) has encroached upon the area of the recess (708) thereby making the recess (708) unavailable for engagement by the secondary tool (750). In one embodiment, the secondary surface is a circuit board and making the recess unavailable for engagement by the secondary tool precludes damage to the circuit board. Accordingly, the slider has limited contact between the shank and the secondary object.

Additionally, the changed position of the slider can be observed. The observed change can be interpreted by a user or machine to indicate a condition. The condition can be, but is not limited to, that the apparatus is overextended, the improper size, or touching a secondary surface. Accordingly, the position of the slider can indicate a condition.

It is well known in the art that many different mechanical fastener types are available for installation. In one embodiment, the apparatus contains threads. In one embodiment, the apparatus does not contain any threads. In one embodiment the apparatus is selected from the group consisting of screw, nail, rivet or bolt. The apparatus is not limited to a single mechanical fastener type.

In one embodiment, the apparatus is a screw. The screw has a head for engaging the installation tool. The head type should not be considered limiting. In one embodiment, the drive style of the head may be but is not limited to Phillps, slotted, combination, Torx, security Torx, Torq-set, Hex, Security hex, Pozidriv, Frearson, Square, Robertson, 12-point flange, Allen, socket, Tri-Wing, Spanner head, Clutch, One-way, double-square, triple-square, polydrive, spline drive, double hex, Bristol and Pentalope.

The tool, similarly, should not be considered limiting and may be any tool used to install the corresponding apparatus. In one embodiment, when the tool is engaged it can be used to provide a torque on the apparatus. In one embodiment, where the tool is engaged on the apparatus it may be used to provide a downward or upward force on the apparatus. In one embodiment, the tool may be but is not limited to a screw driver, powered screw driver (air, electric or other), ratcheting screw driver, wrench, socket, nut driver, Allen key, hex key, or torx key.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

It will be appreciated that, although specific embodiments have been described herein for purposes of illustration, various modifications may be made without departing from the spirit and scope of the embodiments. Accordingly, the scope of protection of this embodiments is limited only by the following claims and their equivalents.

The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the embodiments for various embodiments with various modifications as are suited to the particular use contemplated. Accordingly, the implementation of a shank and a slider can be used to disengage an installation tool and indicate a change in height of the apparatus.

It will be appreciated that, although specific embodiments have been described herein for purposes of illustration, various modifications may be made without departing from the spirit and scope of the embodiments. In particular, a plug could be equipped with a slider and installed in a friction fit opening wherein the slider indicates the correct depth for the plug in a fluidics system. Accordingly, the scope of protection of the embodiments is limited only by the following claims and their equivalents.

What is claimed is:

1. An apparatus comprising:
a shank having a proximal end and an oppositely disposed distal end, the shank comprising an interior non-threaded surface defining a shank cavity within the shank, the shank cavity extending through the shank from the proximal end to the distal end;
a slider, having a first and second end, positioned within the shank cavity, wherein the slider comprises a non-threaded surface slidingly engaged with the shank interior non-threaded surface;
the proximal end of the shank having a recess; and
wherein a position of the slider with respect to the shank cavity limits engagement with the recess.

2. The apparatus of claim 1, wherein the slider is comprised of a non-conductive material.

3. The apparatus of claim 1, further comprising the slider, having a non-uniform width, including and a widest point positioned between the first end and the second end.

4. The apparatus of claim 3, further comprising a retainer positioned with respect to the shank, the retainer to retain the slider positioned in the shank cavity, and the retainer further comprising an internal opening to receive the slider.

5. The apparatus of claim 4, further comprising the shank cavity having a non-uniform opening, including a first opening positioned proximal to an end selected from the group consisting of: the first end of the slider and the second end of the slider, the first opening having a size smaller than a size measurement of the slider.

6. The apparatus of claim 4, wherein the retainer is removable from the shank.

7. The apparatus of claim 1, further comprising the shank cavity having a non-uniform size, including a proximal end of the cavity positioned adjacent to the proximal end of the shank having a first size and a distal end of the cavity positioned adjacent to the distal end of the shank having a second size, wherein the non-uniform size limits translation of the slider.

8. The apparatus of claim 1, further comprising the slider having a length sized with respect to a shank length.

9. The apparatus of, claim 1, wherein engagement of the slider with a secondary surface limits communication of the shank with the secondary surface.

10. The apparatus of claim 9, wherein the secondary surface is a circuit board and the limited communication of the shank with the circuit board limits damage to the circuit board.

11. The apparatus of claim 1, wherein a position of the slider with respect to the shank cavity disengages a tool from the recess.

12. The apparatus of claim 1, wherein a position of the slider with respect to the shank cavity indicates the apparatus being an improper size.

13. The apparatus of claim 1, wherein the second end of the slider is initially at a predetermined distance from the distal end of the shank and wherein a decrease in the predetermined distance limits engagement with the recess.

14. A system for comprising:
a shank having a proximal end and an oppositely disposed distal end;
the proximal end of the shank having a recess;
a shank cavity extending through the shank from the proximal end to the distal end, the shank cavity including a non-threaded surface; and
a slider, having a first and second end, positioned within the shank cavity, wherein the slider comprises a non-threaded surface slidingly engaged with the shank cavity non-threaded surface, wherein a position of the slider with respect to the shank cavity limits engagement with the recess.

15. The system of claim 14, wherein the slider is comprised of a non-conductive material.

16. The system of claim 14, wherein engagement of the slider with a secondary surface limits communication of the shank with the secondary surface.

17. A method comprising:
providing a shank having a proximal end and an oppositely disposed distal end, the proximal end of the shank having a recess, and a shank cavity extending through the shank from the proximal end to the distal end, the shank cavity including a non-threaded surface;
positioning a slider within the shank cavity with respect to a position of the fastener, the slider having a first and second end, positioned within the shank cavity wherein the slider comprises a non-threaded surface slidingly engaged with the shank cavity non-threaded surface; and
as a position of the slider changes with respect to the shank cavity, the slider limiting engagement with the recess.

18. The method of claim 17, wherein the slider is comprised of a non-conductive material.

19. The method of claim 17, further comprising positioning the slider to engage a secondary surface, and the engagement of the secondary surface limiting communication of the shank with a secondary surface.

20. The method of claim 19, wherein the secondary surface is a circuit board and limiting communication of the shank with the circuit board limits damage to the circuit board.

* * * * *